(12) United States Patent
Augesky et al.

(10) Patent No.: US 7,825,637 B2
(45) Date of Patent: Nov. 2, 2010

(54) METHOD AND DEVICE FOR CONTROLLING A CAPACITIVE LOAD

(75) Inventors: Christian Augesky, Regensburg (DE); Martin Götzenberger, Ingolstadt (DE)

(73) Assignee: Siemens AG, Munich (DE)

( * ) Notice: Subject to any disclaimer, the term of this patent is extended or adjusted under 35 U.S.C. 154(b) by 799 days.

(21) Appl. No.: 11/793,991

(22) PCT Filed: Nov. 11, 2005

(86) PCT No.: PCT/EP2005/056250
§ 371 (c)(1),
(2), (4) Date: Jun. 25, 2007

(87) PCT Pub. No.: WO2006/069869
PCT Pub. Date: Jul. 6, 2006

(65) Prior Publication Data
US 2008/0116855 A1 May 22, 2008

(30) Foreign Application Priority Data
Dec. 23, 2004 (DE) ..................... 10 2004 062 385

(51) Int. Cl.
*H02J 7/00* (2006.01)
(52) U.S. Cl. ................... 320/166; 320/167; 310/116.03
(58) Field of Classification Search ................. 320/166, 320/167; 310/116.03
See application file for complete search history.

(56) References Cited

U.S. PATENT DOCUMENTS

| 4,833,584 A | * | 5/1989 | Divan ........................... 363/37 |
| 6,147,433 A | * | 11/2000 | Reineke et al. ......... 310/316.03 |
| 6,563,252 B2 | * | 5/2003 | Schrod .................. 310/316.03 |
| 2002/0011762 A1 | * | 1/2002 | Klenk et al. ........... 310/316.03 |
| 2002/0121958 A1 | | 9/2002 | Schrod |

FOREIGN PATENT DOCUMENTS

| DE | 38 872 T2 | 9/1993 |
| DE | 199 44 733 A1 | 3/2001 |
| DE | 199 52 950 A1 | 6/2001 |
| DE | 101 14 421 A1 | 10/2002 |
| DE | 103 03 779 A1 | 7/2004 |
| DE | 10 2004 007 391 A1 | 9/2004 |
| DE | 10 2004 009 614 A1 | 9/2005 |

* cited by examiner

*Primary Examiner*—Edward Tso
*Assistant Examiner*—Samuel Berhanu
(74) *Attorney, Agent, or Firm*—Laurence A. Greenberg; Werner H. Stemer; Ralph E. Locher

(57) ABSTRACT

A capacitive load is controlled by charging and respectively discharging by way of a load current, which is allowed to oscillate between a maximum default and a minimum default. The maximum default increases monotonously in a first step, remains essentially constant in a second step, and decreases monotonously in a third step during a charging process. The minimum default decreases monotonously in a first step, remains essentially constant in a second step, and increases monotonously in a third step during a discharging process. A variable temporal overlap of the third step of the charging process and the first step of the subsequent discharging process is provided to set a required degree of charging. This results in a high level of resolution and reproducibility of the control.

9 Claims, 2 Drawing Sheets

METHOD AND DEVICE FOR CONTROLLING A CAPACITIVE LOAD

BACKGROUND OF THE INVENTION

Field of the Invention:

The present invention relates to a method and device for controlling a capacitive load, in particular a piezoelectric actuator for an injection valve of an internal combustion engine.

When controlling a capacitive load, like a piezo actuator, in other words when charging and discharging the capacitive load by means of an electric load current, considerable demands are placed on the electronic control system. One embodiment of a capacitive final control element is a piezoelectric actuator (abbreviated to piezo actuator), as used for example to activate an injection valve. Such an injection valve is used in internal combustion engines to inject fuel (e.g. gas, diesel, etc.) in a combustion chamber. Very stringent demands are placed here on an exact and reproducible opening and closing of the valve and therefore also on the electronic control system. In this process voltages have to be provided in the range of up to several 100V and load currents of more than 10 A have to be provided in the short term for charging and discharging purposes. Control generally takes place in fractions of milliseconds. At the same time the current and voltage have to be supplied to the final control element in the most controlled manner possible during these charging and discharging processes.

A circuit arrangement for controlling a piezo actuator is known from DE 199 44 733 A1, wherein the actuator is charged by a charging capacitor by way of a transformer. To this end a charging switch disposed on the primary side of the transformer is controlled with a pulse width modulated control signal. The charging switch and also a discharging switch are embodied there as controllable semiconductor switches. Predetermined energy packets are supplied to or drawn from the piezo actuator during charging and discharging. If energy packets are required, which are smaller than the predetermined energy packets, the known circuit arrangement requires a highly effective output filter for temporal averaging of the energy supplied to the piezo actuator and drawn from it again. The precise and reproducible setting of a required degree of charging is therefore problematic with the known circuit arrangement.

SUMMARY OF THE INVENTION

It is an object of the present invention to specify a method and device for controlling a capacitive load, which are characterized by a high resolution and reproducibility.

This object is achieved with a method as claimed in claim 1 and a device as claimed in claim 6. The dependent claims relate to advantageous developments of the invention.

The invention provides a method for controlling a capacitive load, in particular a piezo actuator for an injection valve of an internal combustion engine, said method comprising charging processes and discharging processes for charging and respectively discharging the capacitive load by means of a load current, which is allowed to oscillate between a maximum default and a minimum default, with the maximum default increasing monotonously in a first step, remaining essentially constant in a second step and decreasing monotonously in a third step during a charging process and with the minimum default decreasing monotonously in a first step, remaining essentially constant in a second step and increasing monotonously in a third step during a discharging process, with a variable temporal overlap of the third step of the charging process and the first step of the subsequent discharging process being provided to set a required degree of charging.

With the inventive control the load current is allowed to oscillate between two default values, which can be achieved with control concepts known widely per se, perhaps by simple measurement of the actual load current and control of charging and discharging switches based thereon. The required degree of charging (e.g. electric charge stored in the capacitive load at the end of a charging process) can be set with high resolution and in an easily reproducible manner by means of the charging and discharging processes divided respectively into three steps according to the invention, since a series of parameters to be varied are available for this purpose, as described below. One such parameter used according to the invention to set a required degree of charging is a temporal overlap of the third step of the charging process and the first step of the subsequent discharging process. The setting of the energy or charge stored as a maximum in the capacitive load can hereby be varied without significant quantization, in other words essentially continuously, even in the case of control circuit concepts provided in a comparatively simple manner.

In one embodiment provision is made for the control to provide for the possibility of providing a temporal overlap of the third step of the discharging process and the first step of the subsequent charging process, even during the transition from a discharging process to a subsequent charging process, and of varying it according to operating parameters.

Where the capacitive load is the piezo actuator of a fuel injector of an internal combustion engine, it is possible to achieve exact and reproducible opening and closing of the injection valve accordingly. It should be pointed out in this context that, in order to comply with future exhaust gas emission limits, the number of fuel injection processes per combustion stroke must be increased (injection sequences with pre-, main and post-injection(s)). As a result the individual injection times and therefore also the activation times for the piezo actuator become increasingly shorter, thereby placing additional demands on the electronic control system.

In one development of the invention provision is made also to vary the maximum default achieved at the end of the first step during the charging process and/or the temporal duration of the second step, in order to set the degree of charging. This means that one or two further parameters are advantageously used to set the degree of charging.

The setting of the degree of charging can be achieved in a particularly exact manner and with simple circuitry, if the parameter(s) to be varied is/are read from a set of characteristic curves. When controlling a piezo actuator of a fuel injector, such parameters can be predetermined from the set of characteristic curves, for example as a function of a control default (e.g. required injection quantity) and further measured variables or variables derived from measured variables. The set of characteristic curves can for example include the assignment of different operating parameters of the internal combustion engine, for example rotational speed and/or load to the required quantity of fuel and therefore to the desired piezo charge and can for example be determined by experiment or calculation and stored.

In one preferred embodiment provision is made for the minimum default to be essentially zero during the charging process and/or for the maximum default to be essentially zero during the discharging process. This means that the load current is on average gradually increased during the first step of the charging process, remains roughly constant during the second step and is reduced again during the third step. The same applies alternatively or additionally to the discharging process. In the case of fuel injection in an internal combustion engine, it is possible to prevent an overswing of the final control element in the initial and final profiles of the charging and respectively discharging processes, due to the gradual change in the charge over time. Disruptive mechanical or acoustic effects can also be reduced therewith.

The temporal profile of the maximum default during the charging process and/or the temporal profile of the minimum default during the discharging process is/are preferably roughly trapezoidal in form. With this default form it is possible to set the required degree of charging in a particularly simple manner by changing parameters of said trapezoidal form. This is optional in respect of the variable temporal overlap of the third step of the charging process and the first step of the subsequent discharging process. In addition to the mentioned trapezoidal form of the maximum default and/or minimum default, any other curve forms with a monotonous start/end can of course also be considered within the context of the invention, if they allow the temporal overlap during the transition from charging to discharging.

The maximum default and minimum default can for example be produced by a digital control unit, perhaps based on the reading of a look-up table.

In one preferred embodiment the inventive control device comprises:
  an output stage for providing the load current, based on a control signal input to the output stage, and
  a control unit for providing the control signal, based on a control default and at least on one measured value of the actual load current.

The output stage used here can be realized in a many diverse ways. Appropriate circuit concepts are generally known to the person skilled in the art. In one embodiment the output stage is for example embodied as a buck-boost converter. A charging switch and a discharging switch can be disposed here as a half-bridge between the terminals of a supply voltage source, to set a load control voltage at a pick-off between the switches, said load control voltage being applied to the capacitive load, for example by way of a current-limiting component (e.g. choke coil). Where semiconductor switches are used for the charging and discharging switches, these are for example configured as MOS field effect transistors (MOSFETs) or as insulated gate bipolar transistors (IGBTs). The control signal is then applied to the control terminals of these semiconductor switches by the control unit.

The invention is described in more detail below based on exemplary embodiments with reference to the accompanying drawings, in which:

DESCRIPTION OF THE INVENTION

Figure 1:
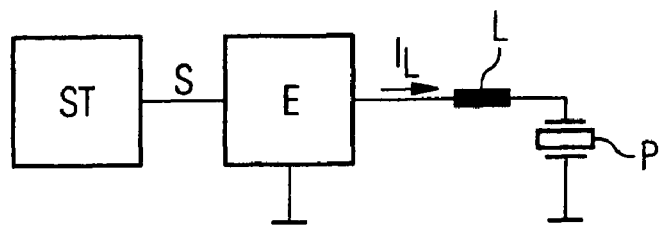
FIG. 1 shows a block circuit diagram of a control circuit.

FIG. 1 shows a block circuit diagram of a circuit for controlling a piezo actuator P, which is connected by way of an inductance L to an output stage E. The output stage E supplies a current $I_L$ charging or discharging the piezo actuator P by way of the inductance L. The output stage E can be embodied as a conventional voltage converter or as a buck-boost, flyback or SEPIC converter and supplies the current as a function of a control signal S (e.g. one or more control voltages). The control signal is determined by a control unit ST based on a control default and taking into account measured variables, which are determined in the region of the output stage E and/or the region of the piezo actuator P (e.g. piezo voltage and/or piezo current).

Figure 2:
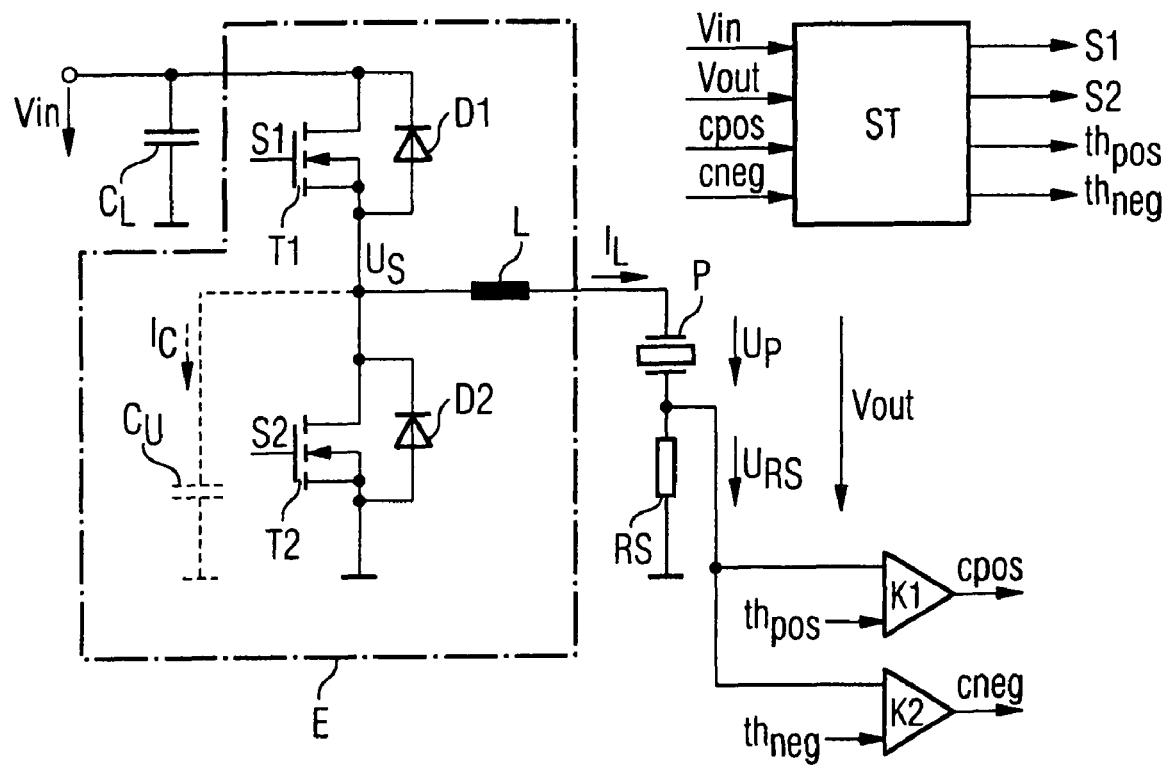
FIG. 2 shows a more specific example of a control circuit.

FIG. 2 shows an exemplary embodiment of a control circuit according to FIG. 1.

An output stage E supplies a load current $I_L$ starting from a circuit node (voltage Us) again by way of an inductance L to a piezo actuator P, which is disposed in a series circuit with a current-sensing resistor RS.

The voltage $U_{RS}$ dropping out at the resistor RS is representative of the load current $I_L$ flowing during the charging and discharging of the piezo actuator P. An output voltage $V_{out}$ results together with the piezo voltage $U_P$ dropping out at the piezo actuator P. Since the output stage E is supplied by an input voltage $V_{in}$, the circuit arrangement can also be considered to be a controlled voltage converter, which converts the voltage $V_{in}$ to the voltage $V_{out}$.

As what is known as a shunt, the resistor RS has a very low resistance value, so that in practice the voltage dropping out there is negligible compared with the piezo voltage.

The measured voltage $U_{RS}$ is fed to two comparators K1 and K2, to compare this voltage, which is representative of the load current $I_L$, with a positive threshold value $th_{pos}$ and a negative threshold value $th_{neg}$. The signals corresponding to the comparison result at the output of the comparators are referred to as $c_{pos}$ and $c_{neg}$.

The circuit node supplying the piezo control voltage Us is a center pick-off of a series circuit comprising a charging switch T1 and a discharging switch T2. These switches T1 and T2 are advantageously configured respectively as transistors, specifically n-channel MOSFETs. A freewheeling diode D1 or D2 is disposed parallel to these switches. Where MOSFETs are used as switches, it is also possible to dispense with said diodes, since due to their structure these transistors have such an integrated diode. In this instance external freewheeling diodes would be optional. The input voltage $V_{in}$ is applied to the series circuit comprising T1 and T2. A charging energy storage unit or capacitor $C_L$ is disposed parallel to the charging switch T1. Alternatively or additionally a ring-around energy storage unit or capacitor could also be disposed parallel to the discharging switch T2. Such a ring-around capacitor $C_U$ is shown with a broken line in the figure.

A control unit ST initiates and controls the charging processes and discharging processes to be carried out by the output stage E to charge or discharge the actuator P by means of the load current $I_L$. To this end the control unit ST supplies control signals $S_1$ and $S_2$ on the output side and these are fed to the control terminals (gates) of the transistors T2 and T2.

The signals $V_{in}$, $V_{out}$, $c_{pos}$ and $c_{neg}$ are supplied to the control unit ST on the input side.

In the exemplary embodiment shown the threshold values $th_{pos}$ and $th_{neg}$ required to compare the actual load current $I_L$ with a maximum default and a minimum default are also supplied by the control unit ST.

Figure 3:
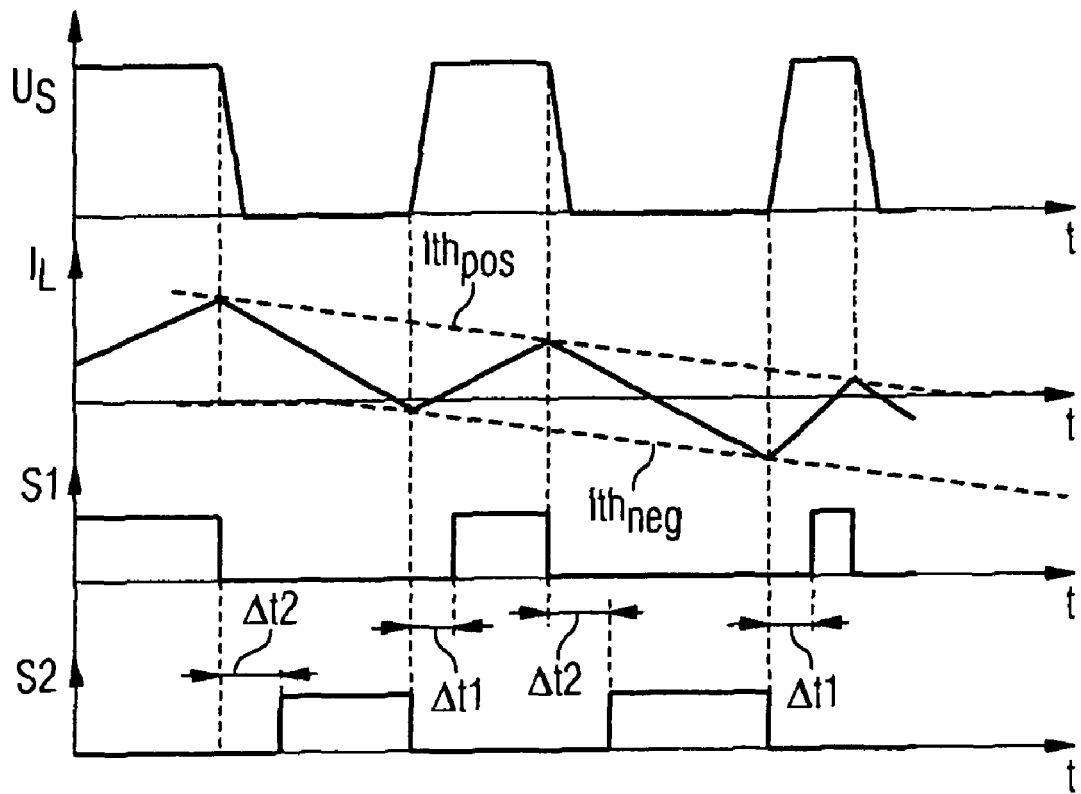
FIG. 3 shows temporal profiles of a number of signals during operation of the circuit according to FIG. 2.

FIG. 3 shows a temporal profile diagram (time: t) to illustrate the transition from a charging process to a subsequent discharging process.

At the start of the temporal profile shown the charging switch T1 is closed and the discharging switch T2 is open (see control signals $S_1$ and $S_2$ in the figure). A maximum value of the node voltage Us predetermined by the input voltage $V_{in}$ correspondingly results and this is applied to the actuator P by way of the inductance L. In this phase the load current $I_L$ flowing into the actuator increases constantly.

As soon as the load current reaches a maximum default $Ith_{pos}$, which is detected by way of the comparator output signal $c_{pos}$, the control unit initiates an opening of the charging switch T1 and—after a predetermined time delay $\Delta t2$—a closing of the discharging switch T2. Immediately after the opening of the switch T1 the load current is initially supplied by way of the freewheeling diode D2. The time delay $\Delta t2$ allows a "soft" switching of the switch T2 disposed parallel hereto. Depending on the specific dimensions of the components of the output stage E, in particular depending on the presence of the optional ring-around capacitor $C_U$ or its capacitance, the profile of the load current $I_L$ can differ to a more or less significant degree from the profile shown in FIG. 3. It is however important that the current drops once again a certain time after the opening of the switch T1 or the closing of the switch T2.

As soon as the load current $I_L$ reaches the minimum default $Ith_{neg}$ defined by the threshold value $th_{neg}$, as identified by the comparator output signal $c_{neg}$, the control unit ST initiates an opening of the switch T2 and after a predetermined time delay $\Delta t1$ a closing of the switch T1. The current $I_L$ then increases again.

As shown in FIG. 3, the described processes are repeated, in such a manner that the load current oscillates between the maximum default and the minimum default. There should preferably be around 5 to 10 "load current pulses" within each rising or dropping edge of the maximum and minimum defaults.

Figure 4:
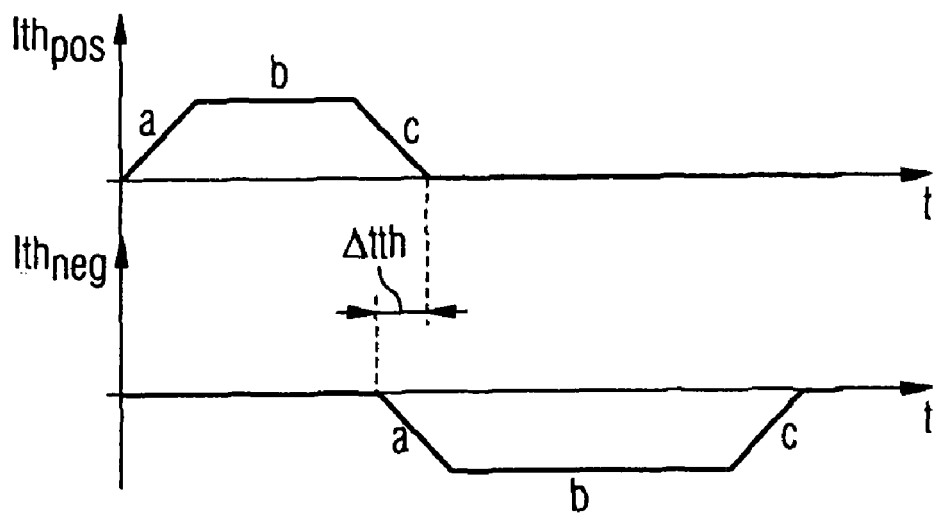
FIG. 4 shows the temporal overlap of the end of a charging process with the start of a subsequent discharging process as provided according to FIG. 2 during operation of the circuit.

FIG. 4 shows the temporal profile of these current defaults $Ith_{pos}$ and $Ith_{neg}$ for a charging process and a subsequent discharging process.

During the charging process the minimum default $Ith_{neg}$ is essentially zero, while during the discharging process the maximum default $Ith_{pos}$ is essentially zero. During the charging process the maximum default initially increases in a linear manner (step a), to remain constant for a time (step b) and finally to decrease again in a linear manner (step c). In a temporal profile, this default is therefore trapezoidal in form. Similarly the minimum default $Ith_{neg}$ is trapezoidal in form during the discharging process, in other words it is also divided into three such steps a, b, c.

To set a required degree of charging, which in the exemplary embodiment shown for example represents a maximum actuator deflection or actuator charge achieved at the end of the charging process, the control unit ST provides a more or less large temporal overlap $\Delta tth$ of the third step c of the charging process with the first step a of the discharging process. This temporal overlap, which is variable during operation, allows the piezo actuator to be controlled with high resolution and good reproducibility.

There is a continuous changeover from charging to discharging to a certain extent. In a temporal transition region the current default values used (upper and lower thresholds $th_{pos}$ and $th_{neg}$) are changed at the same time and in the same sense. Outside the overlap zone $\Delta tth$ the control circuit operates practically only using one of the two current defaults (positive or negative), which are used as reference values for current regulation (buck or boost converter principle).

The invention claimed is:

1. A method of controlling a capacitive load, the method which comprises:
    charging and discharging the capacitive load by way of a load current and thereby allowing the load current to oscillate between a maximum default and a minimum default;
    wherein the maximum default increases monotonously in a first step, remains substantially constant in a second step, and decreases monotonously in a third step during a charging process;
    wherein the minimum default decreases monotonously in a first step, remains substantially constant in a second step, and increases monotonously in a third step during a discharging process; and
    setting a required degree of charging by overlapping, with a variable temporal overlap, the third step of the charging process and the first step of the subsequent discharging process.

2. The method according to claim 1, wherein the capacitive load is a piezo actuator for an injection valve of an internal combustion engine.

3. The method according to claim 1, wherein the step of setting the degree of charging further comprises varying at least one of the maximum default achieved at an end of the first step during the charging process and the temporal duration of the second step.

4. The method according to claim 1, which comprises reading parameters to be varied for setting the degree of charging from a set of characteristic curves.

5. The method according to claim 1, which comprises setting the minimum default to substantially zero during the charging process and/or setting the maximum default to substantially zero during the discharging process.

6. The method according to claim 1, which comprises defining at least one of a temporal profile of the maximum default during the charging process and a temporal profile of the minimum default during the discharging process to have a roughly trapezoidal form.

7. A device for controlling a capacitive load, comprising means configured to implement the method according to claim 1.

8. A device for controlling a capacitive load, comprising:
    means for charging and discharging the capacitive load by way of a load current and thereby allowing the load current to oscillate between a maximum default and a minimum default;
    wherein the maximum default increases monotonously in a first step, remains substantially constant in a second step, and decreases monotonously in a third step during a charging process;
    wherein the minimum default decreases monotonously in a first step, remains substantially constant in a second step, and increases monotonously in a third step during a discharging process; and
    means for setting a required degree of charging by overlapping, with a variable temporal overlap, the third step of the charging process and the first step of the subsequent discharging process.

9. The device according to claim 8, comprising:
    a control unit for generating a control signal based on a control default and at least one measured value of an actual load current; and
    an output stage connected to said control unit and configured to supply the load current to the capacitive load based on the control signal received from said control unit.

* * * * *